Dec. 18, 1962 W. G. MOEHLENPAH ET AL 3,068,483
APPARATUS FOR FABRICATING WOOD STRUCTURES
Filed July 22, 1960 12 Sheets-Sheet 1
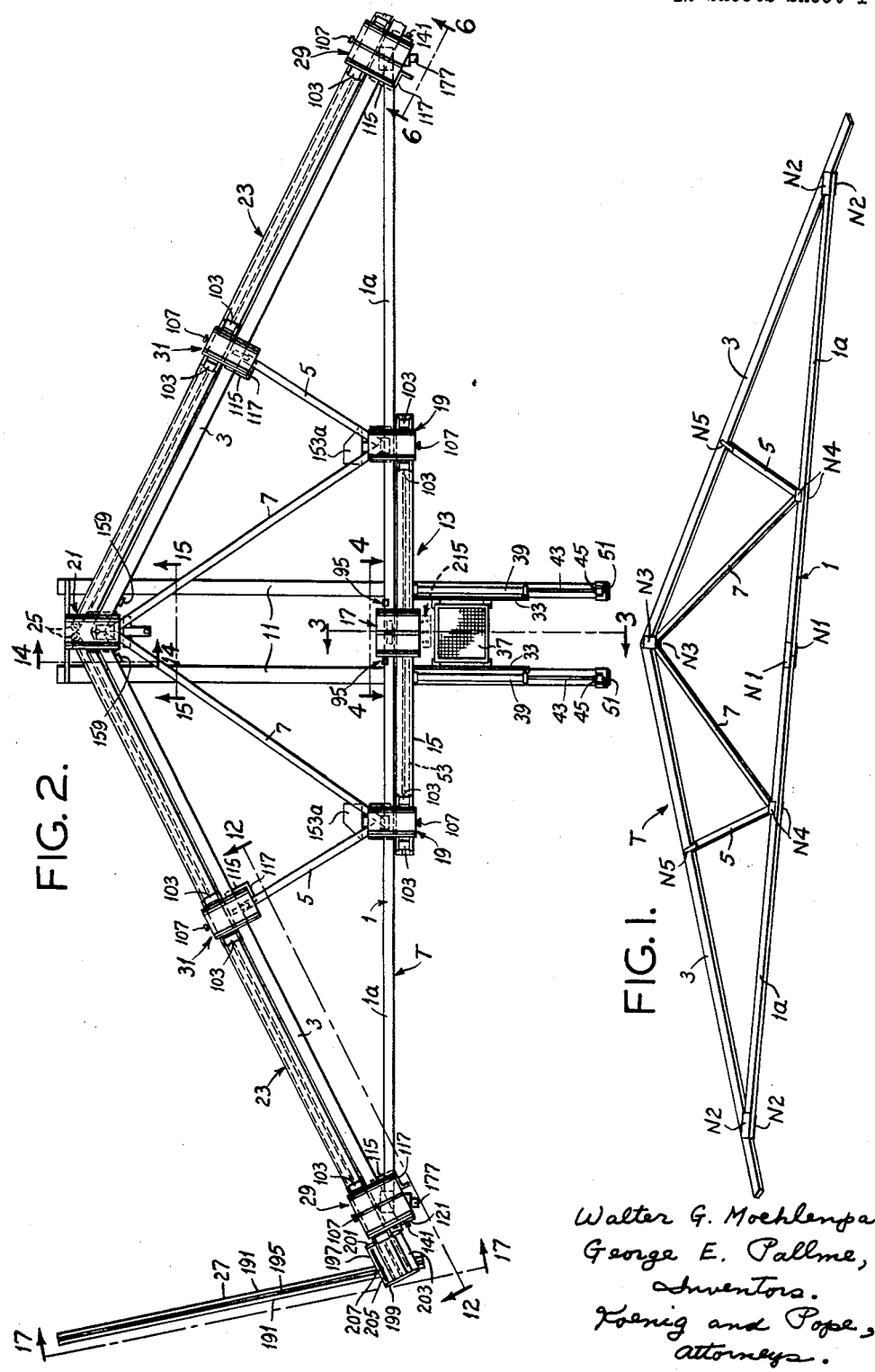
Walter G. Moehlenpah,
George E. Pallme, Jr.,
Inventors.
Koenig and Pope,
Attorneys.

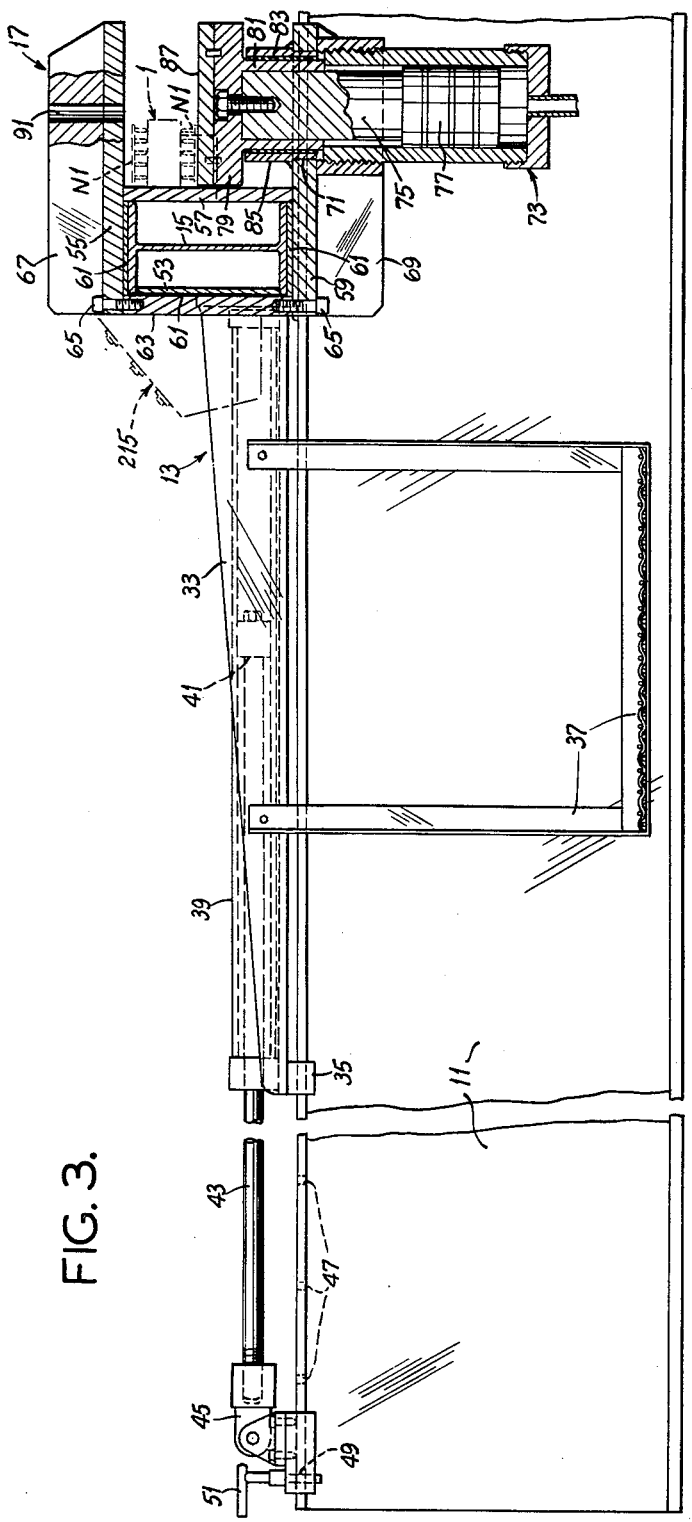

Dec. 18, 1962 W. G. MOEHLENPAH ET AL 3,068,483
APPARATUS FOR FABRICATING WOOD STRUCTURES
Filed July 22, 1960 12 Sheets-Sheet 3

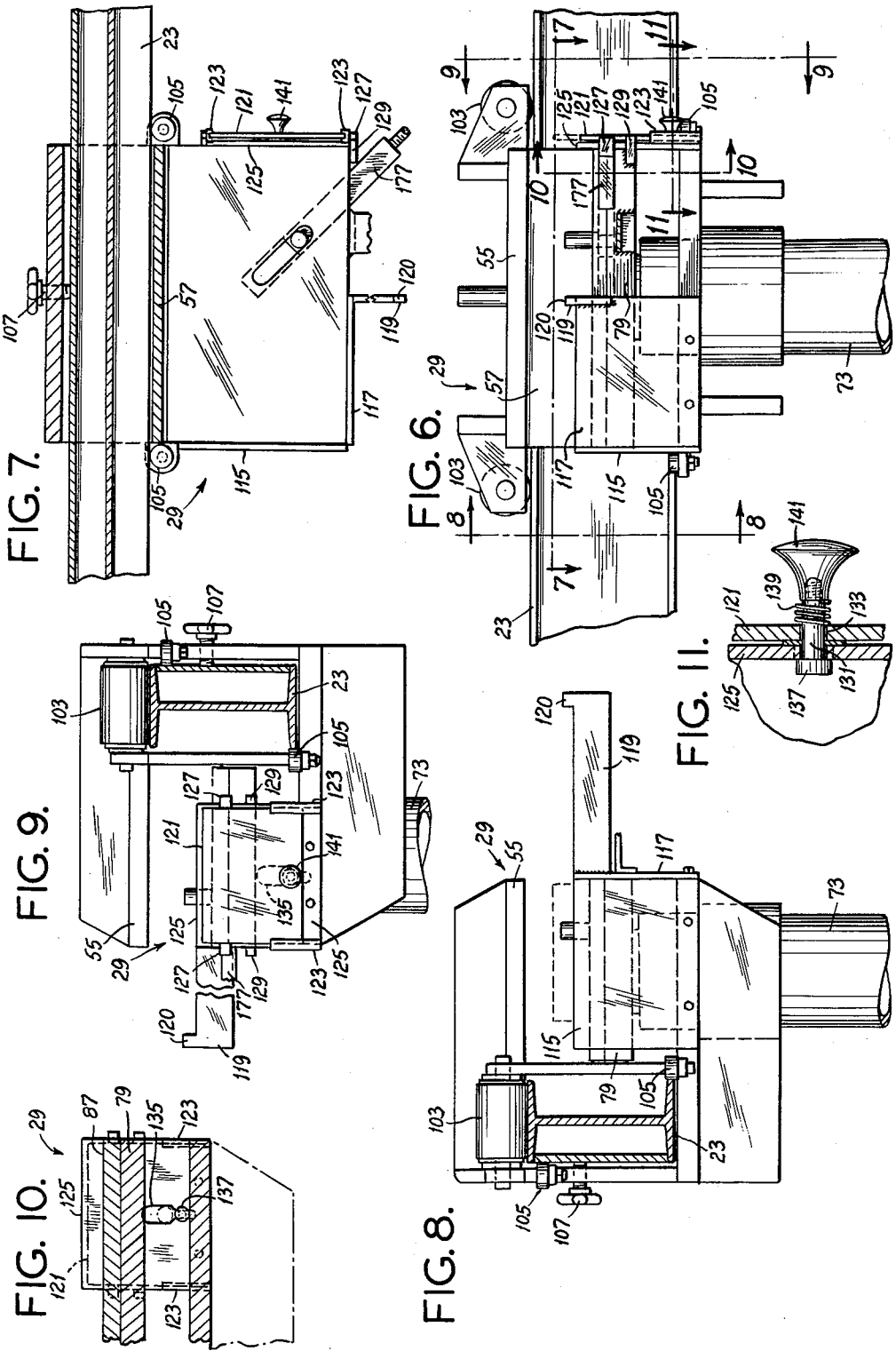

Dec. 18, 1962   W. G. MOEHLENPAH ET AL   3,068,483
APPARATUS FOR FABRICATING WOOD STRUCTURES
Filed July 22, 1960   12 Sheets-Sheet 5

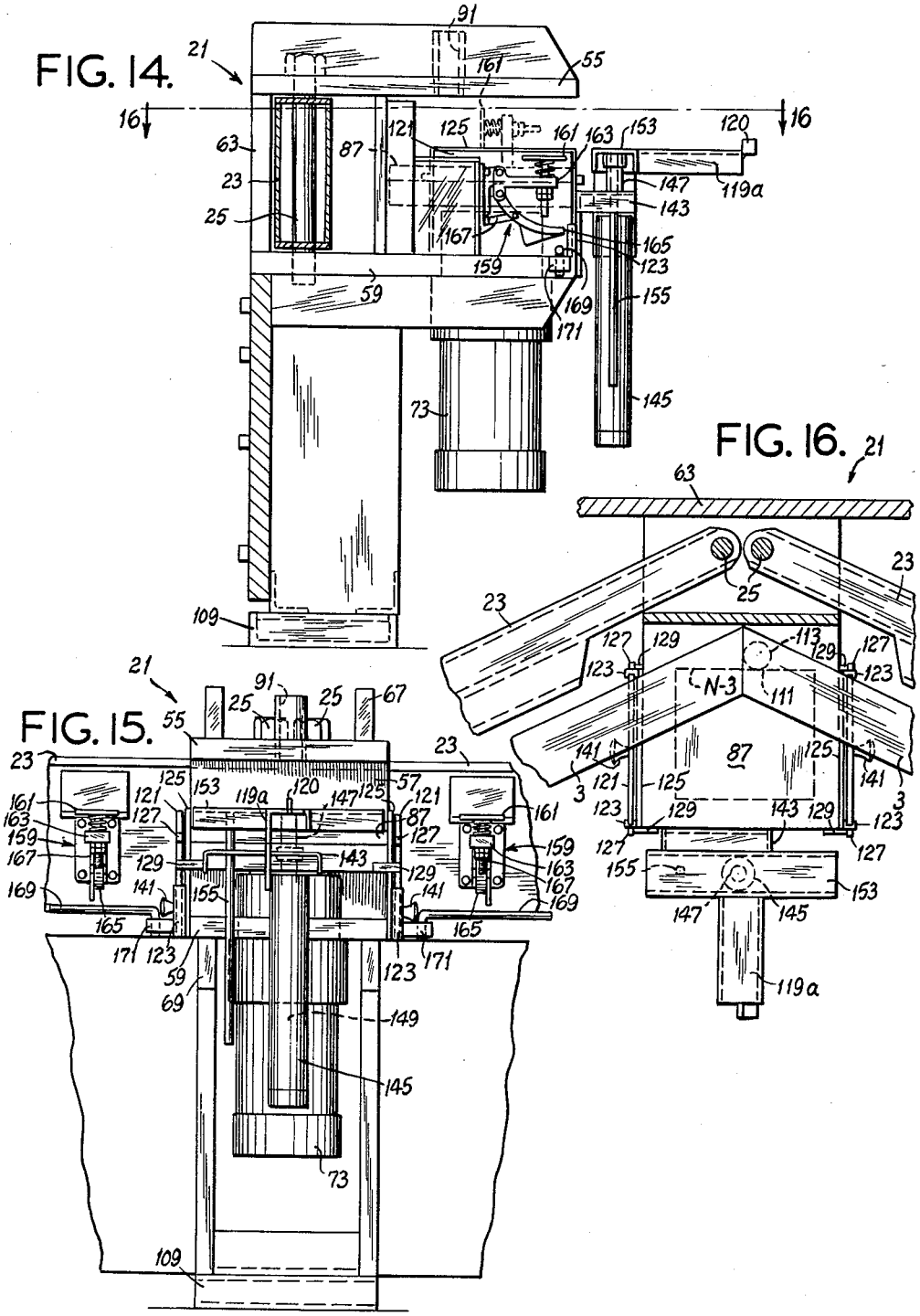

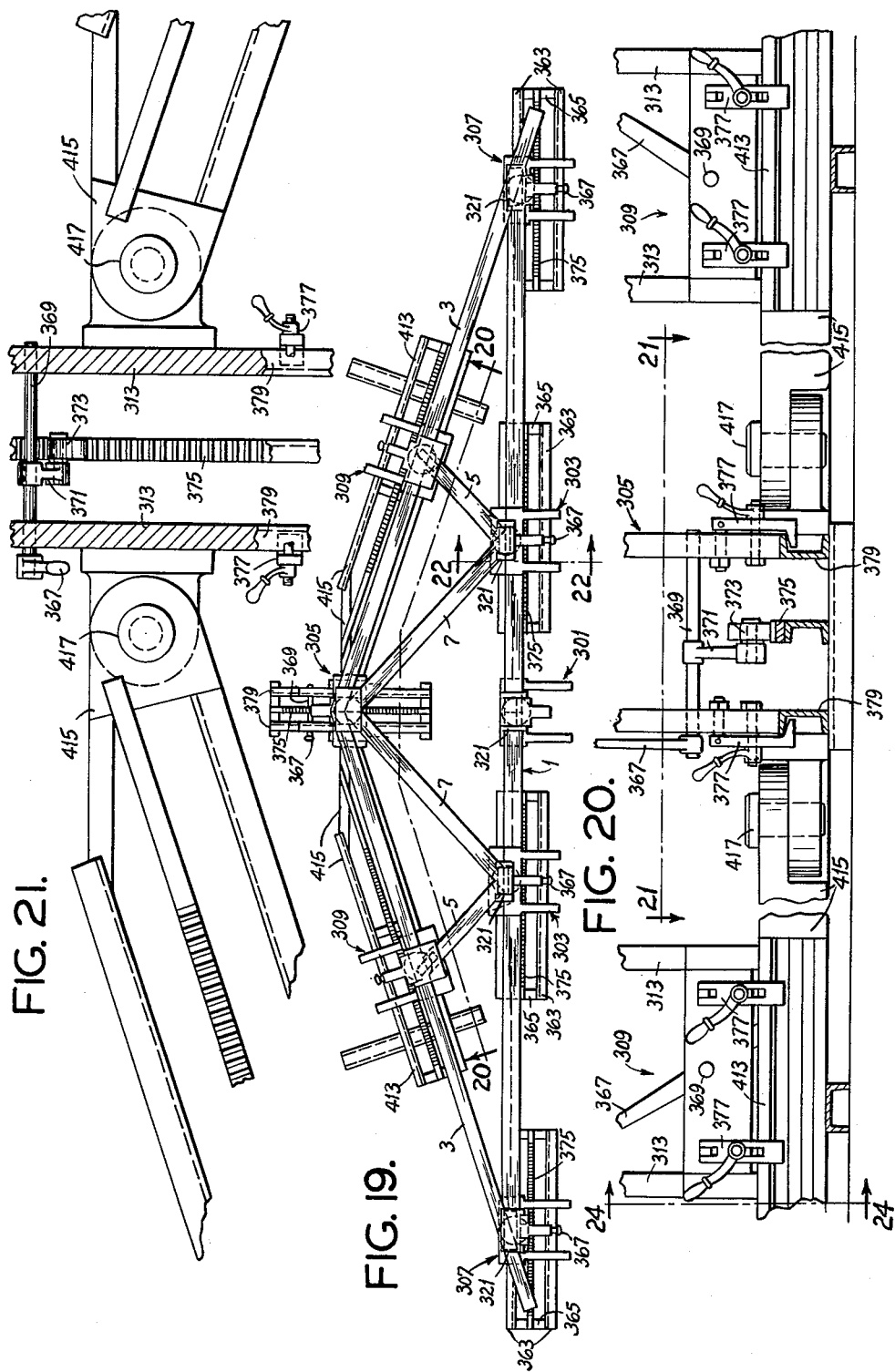

Dec. 18, 1962   W. G. MOEHLENPAH ET AL   3,068,483
APPARATUS FOR FABRICATING WOOD STRUCTURES
Filed July 22, 1960

Dec. 18, 1962 W. G. MOEHLENPAH ET AL 3,068,483
APPARATUS FOR FABRICATING WOOD STRUCTURES
Filed July 22, 1960 12 Sheets-Sheet 10

Dec. 18, 1962   W. G. MOEHLENPAH ET AL   3,068,483
APPARATUS FOR FABRICATING WOOD STRUCTURES
Filed July 22, 1960   12 Sheets-Sheet 11

Dec. 18, 1962 W. G. MOEHLENPAH ET AL 3,068,483
APPARATUS FOR FABRICATING WOOD STRUCTURES
Filed July 22, 1960 12 Sheets-Sheet 12

United States Patent Office 3,068,483
Patented Dec. 18, 1962

3,068,483
APPARATUS FOR FABRICATING WOOD
STRUCTURES
Walter G. Moehlenpah, Ladue, and George E. Pallme,
Jr., St. Louis, Mo., assignors to Hydro-Air Engineering, Inc., St. Louis, Mo., a corporation of Missouri
Filed July 22, 1960, Ser. No. 44,621
21 Claims. (Cl. 1—149)

This invention relates to apparatus for fabricating wood structures, and more particularly to apparatus for fabricating wood roof trusses.

It will be understood that wood roof trusses are widely used in residential and commercial building construction. One such type of truss is a triangular truss consisting of a lower chord, upper chords joined to the ends of the lower chord at the heels of the truss and joined together at the peak of the truss, web members constituting compression members or struts extending from the third points of the lower chord to the midpoints of the upper chords, and web members constituting tension members or ties extending from the third points of the lower chord to the peak, commonly referred to as a W truss. The lower chord may consist of two lengths of lumber positioned end-to-end and spliced together at the center of the length of the lower chord. Another well-known type of truss is the hip truss.

This invention is concerned with apparatus for fabricating such trusses, which functions as a jig for preliminary assembly of pre-cut lower chord, upper chord, strut and tie members of a truss, and which is provided with means for driving nailing plates into the members to fasten them together, among the several objects of the invention being the provision of apparatus of this class for the economical fabrication in mass production of trusses of different dimensions, the provision of apparatus of this class wherein the various members may be clamped in proper position prior to driving the nailing plates, and the provision of apparatus of this class from which a completed truss may be readily removed. In one embodiment of the apparatus, a special pivoted head type of press is used for driving the nailing plates, and it is contemplated that this press may be useful for purposes other than wood truss fabrication. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated:

FIG. 1 is a perspective of a wood W truss such as referred to above;

FIG. 2 is a plan view of an apparatus of this invention for fabricating trusses such as shown in FIG. 1;

FIG. 3 is an enlarged vertical section taken on line 3—3 of FIG. 2;

FIG. 6 is an enlarged view taken on line 6—6 of FIG. 2;

FIG. 7 is a horizontal section taken on line 7—7 of FIG. 6;

FIG. 8 is a vertical section taken on line 8—8 of FIG. 6;

FIG. 9 is a vertical section taken on line 9—9 of FIG. 6;

FIG. 10 is a vertical section taken on line 10—10 of FIG. 6;

FIG. 11 is a horizontal section taken on line 11—11 of FIG. 6;

FIG. 14 is an enlarged vertical section taken on line 14—14 of FIG. 2;

FIG. 15 is an enlarged vertical section taken on line 15—15 of FIG. 2;

FIG. 16 is a horizontal section taken on line 16—16 of FIG. 14;

FIG. 19 is a plan view of a second apparatus of this invention for fabricating trusses such as shown in FIG. 1, and which is also adapted for fabricating hip trusses;

FIG. 20 is an enlarged vertical section taken on line 20—20 of FIG. 19, with parts broken away;

FIG. 21 is a horizontal section taken on line 21—21 of FIG. 20;

Corresponding reference characters indicate corresponding parts throughout the several views of the drawings.

Figure 4:
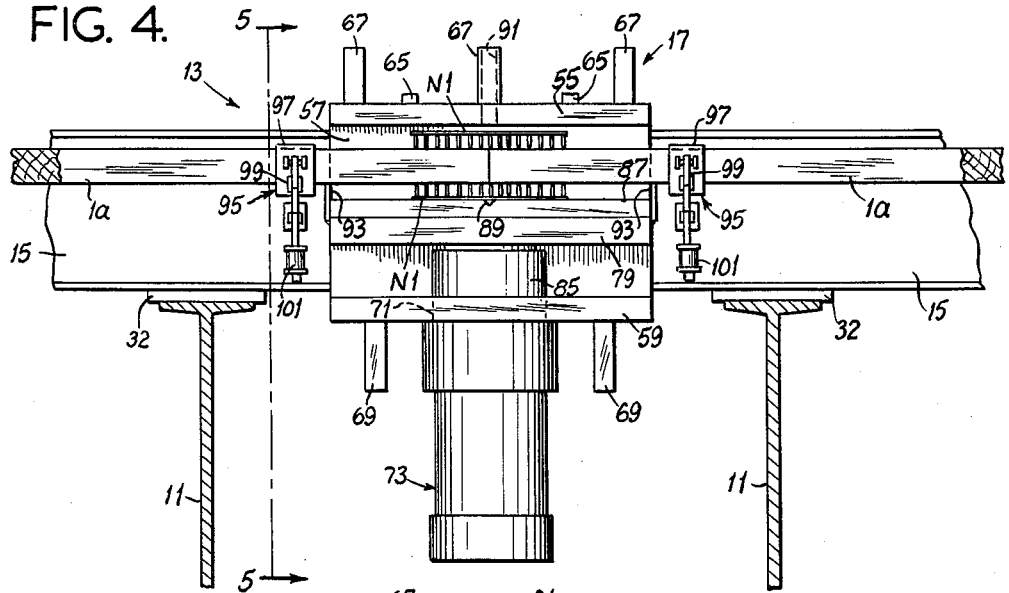
FIG. 4 is an enlarged vertical section taken on line 4—4 of FIG. 2.
Figure 5:
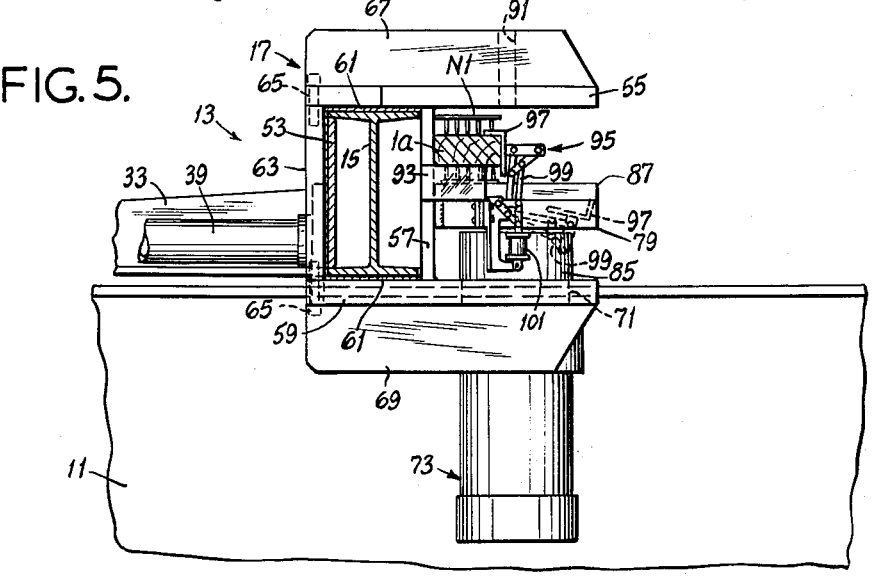
FIG. 5 is a vertical section taken on line 5—5 of FIG. 4.
Figure 12:
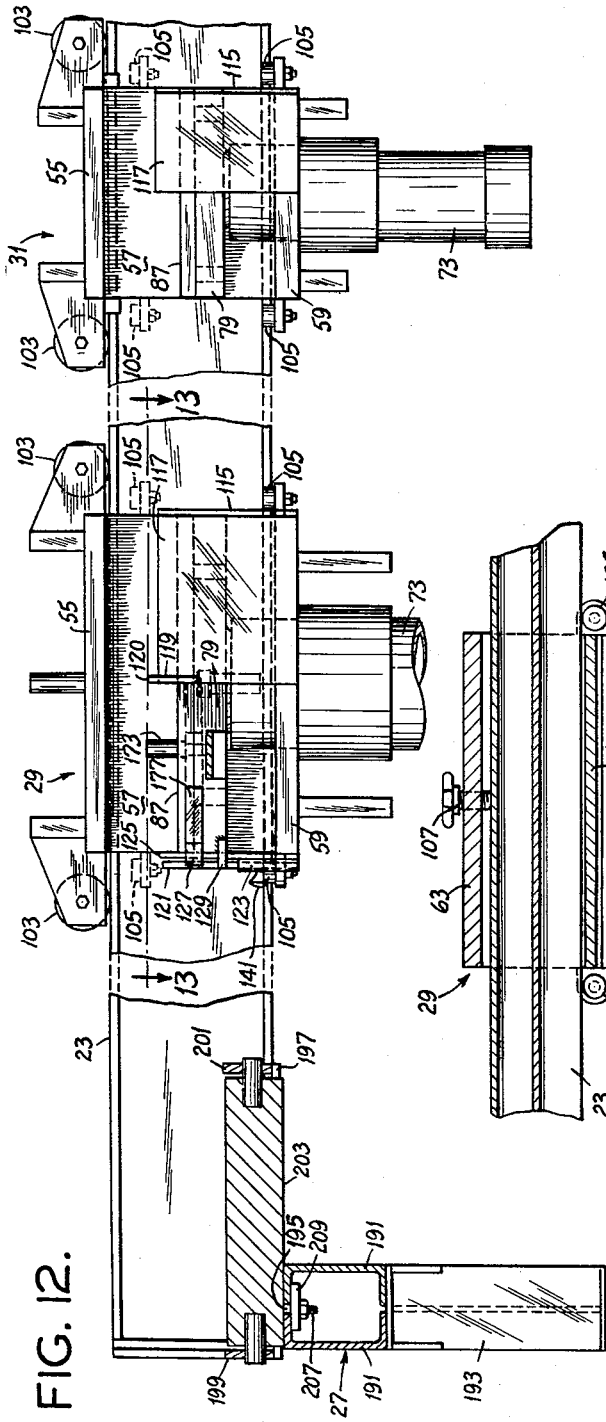
FIG. 12 is an enlarged vertical section taken on line 12—12 of FIG. 2.
Figure 13:
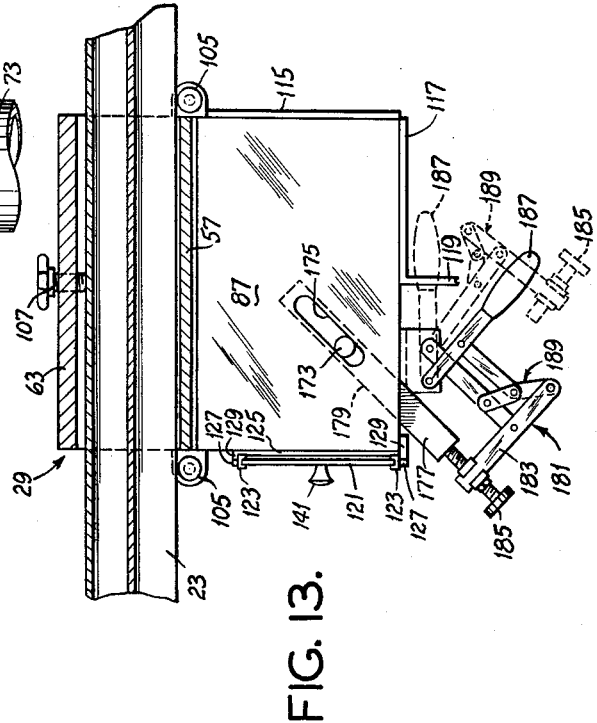
FIG. 13 is a horizontal section taken on line 13—13 of FIG. 12.
Figure 17:
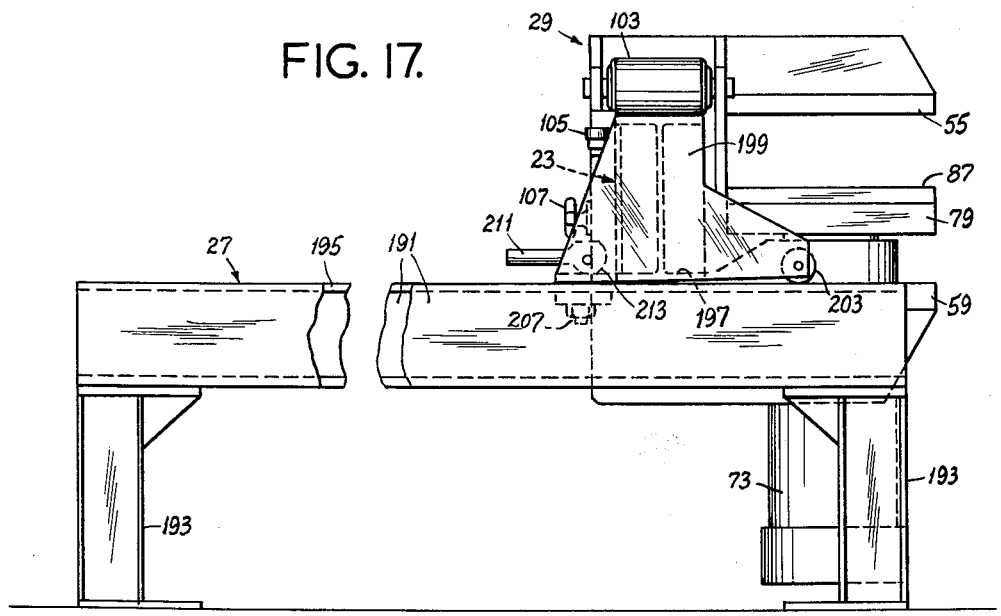
FIG. 17 is a view in elevation taken on line 17—17 of FIG. 2 on a larger scale than FIG. 2 illustrating a clamped position of parts.
Figure 18:
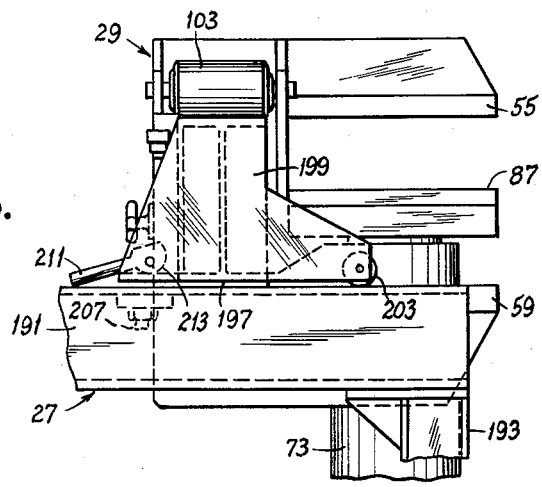
FIG. 18 is a fragment of FIG. 17 illustrating an unclamped position of parts.

Referring to the drawings, FIG. 1 shows a typical triangular wood roof truss T such as is adapted to be fabricated by means of an apparatus of this invention. As shown, truss T is a triangular truss comprising a lower chord 1, upper chords 3 which meet at the peak of the truss, compression members or struts 5 which extend between the third points of the lower chord to the midpoints of the upper chords, and tension members or ties 7 which extend between the third points of the lower chord and the peak. The lower chord consists of two pieces each designated 1a are spliced in end-to-end butting relation at the center of the lower chord by nailing plates such as indicated at N1, one on each face of the truss. These plates are hereinafter referred to as lower chord splice plates. The outer ends of the lower chord members are fastened to the upper chords by nailing plates such as indicated at N2, one on each face of the truss. These plates N2 are hereinafter referred to as heel plates. The upper ends of the upper chords and the ties are fastened together by nailing plates such as indicated at N3, one on each face of the truss. These plates N3 are hereinafter referred to as peak plates. The lower ends of the struts and ties are fastened to the lower chord by nailing plates such as indicated at N4, one on each face of the truss. Plates N4 are hereinafter referred to as lower chord plates. The upper ends of the struts are fastened to the upper chords by nailing plates such as indicated at N5, one on each face of the truss. Plates N5 are hereinafter referred to as upper chord plates.

Now referring to FIGS. 2–18, a first embodiment of an apparatus constructed in accordance with this invention for assembling and nailing pre-cut wood members to form a truss T such as above described is shown to comprise a pair of center rails 11 which may be about nineteen feet long, about two feet high, and spaced about three feet apart, for example. A carriage designated in its entirety by the reference character 13 is slidable on these center rails. The carriage includes a beam 15, referred to as a travelling beam since it travels with the carriage, which extends transversely over the center rails and projects laterally outward on opposite sides of the rails. Beam 15 carries a hydraulic press 17 for driving splice plates N1 and two hydraulic presses 19 for driving lower chord plates N4. Press 17, which may be referred to as the splice press, is located between the rails 11. Presses 19, which may be referred to as the lower chord presses, are located on opposite sides of the rails 11 and are adjustable lengthwise of the travelling beam 15. A hydraulic press 21 for driving the peak plates N3 is mounted in fixed position between the rails adjacent one end (the forward end) thereof. This press 21 may be referred to as the peak press. A pair of horizontal booms, each designated 23, are pivoted at one end thereof as indicated at 25 on the peak press for swinging movement on vertical axes. These booms extend over the center rails and have their outer ends supported on outer rails such as indicated at 27. In FIG. 2, the right-hand outer rail is not shown due to space limitations. Each boom carries a hydraulic press 29, which may be referred to as a heel press, for driving the heel plates N2, and a hydraulic press 31, which may be referred to as an upper chord press, for driving the upper chord plates N5. Presses 29 and 31 are adjustable lengthwise of the booms.

Beam 15 is supported by and slidable on the top of center rails 11, suitable bearing blocks 32 being provided between the rails and the beams. It is movable forward in the direction toward the peak press and rearward away from the peak press. Extending rearward from the beam 15 are outriggers 33 having slides 35 at their rearward ends slidable on the center rails 11. An operator's platform 37 is suspended from outriggers 33 between the center rails. Double-acting hydraulic cylinders 39 extend rearward from the beam 15 above the center rails for moving the beam forward and rearward. Each cylinder 39 has a piston 41 therein and a piston rod 43 extending from the piston through the rearward end of the cylinder. The rearward end of each piston rod is secured to a backstop 45 adapted to be secured at various locations along the length of the respective rail 11. For this purpose, each rail 11 is provided with a series of holes 47 in the top thereof spaced at intervals along its length, and each backstop 45 has a hole 49 receiving a pin 51 adapted to be dropped into a selected hole 47. The backstops thus may be positioned at different locations along the length of rails 11 to set up the apparatus for making trusses of different heights.

The splice press 17, as previously mentioned, is mounted on the travelling beam 15 between the center rails 11. As herein illustrated, beam 15 consists of an H-beam having its web vertical and provided with a vertical reinforcing plate 53 extending lengthwise thereof between the top and bottom flanges of the H-beam adjacent the rearward side of the beam (its side away from the peak press 21). Plate 53 is welded to the top and bottom flanges of the H-beam. Press 17 comprises a rectangular head plate 55 constituting a fixed upper platen welded to the upper edge of a vertical transverse frame plate 57 and a rectangular bed plate 59 welded to the lower edge of the frame plate 57. The latter is located intermediate the forward and rearward edges of plates 55 and 59 and has a height somewhat greater than the height of the beam 15. The assembly 55, 57, 59 is hung on the beam 15, the latter being received between portions of plates 55 and 59 projecting rearward from frame plate 57. The splice press may be fixed in position on beam 15, in which case shims such as indicated at 61 are provided between plates 55 and 59 and the beam flanges. Plates 55 and 59 project somewhat beyond the rearward side of beam 15, and a vertical plate 63 is inserted between plates 55 and 59 at the rear thereof. Screws 65 are threaded through holes in plates 55 and 59 into tapped holes in plate 63 to clamp press 17 on beam 15. If desired, the splice press may be made adjustable on beam 15 one foot off center either way as for splicing together a fourteen-foot member and a sixteen-foot member.

The plate 55 has reinforcing ribs 67 on top and the bed plate 59 has reinforcing ribs 69 on the bottom. The plates 55 and 59 project forward from beam 15 and, in conjunction with the vertical plate 57, define a C-shaped throat. The bed plate 59 has a circular opening 71 (see FIG. 3) therein forward of beam 15. A hydraulic cylinder 73 extends vertically downward from the bed plate coaxial with opening 71. A ram 75 extends upward from piston 77 in the cylinder through opening 71. A rectangular plate 79 is secured on the top of the ram. This plate 79 has a cylindrical collar 81 receiving the upper end of the ram. Collar 81 is slidable in a bushing 83 retained in a sleeve 85 having a reduced lower end portion received in opening 71 and welded to bed plate 59. A rectangular plate 87 constituting the lower platen of the press is mounted on plate 79. This lower platen has a groove 89 (see FIG. 4) in the top extending from front-to-rear providing a guide line for indicating where the butting ends of lower chord members 1a are to be positioned in the press 17. A sight hole 91 is provided in the upper platen 55 in line with groove 89 for observation purposes. Extending forward from the side edges of vertical plate 57 are supports 93 for the lower chord members 1a. At the sides of ram plate 79 are hydraulically operated clamps 95 adapted to clamp the lower chord members 1a placed in the splice press, forcing them downward against supports 93 and rearward against the vertical plate 57, which serves as a back stop for the lower chord members. Each clamp 95 is of a commercially available type, provided with an angle-section jaw 97 which is swingable via toggle mechanism 99 actuated by a double-acting hydraulic cylinder 101 outward and downward away from the clamping position in which it appears in solid lines in FIG. 5 to the open position illustrated in dotted lines in FIG. 5.

Each of the lower chord presses 19 is similar to the splice press 17 in comprising a fixed upper platen 55, a vertical plate 57, a bed plate 59, a double-acting cylinder 73, a ram 75, a ram plate 79, and a lower platen 87 on the ram plate. Each lower chord press 19 to enable it to be readily adjusted lengthwise of beam 15, is provided with rollers 103 at the top which roll on the top flange of beam 15, and lateral rollers such as indicated at 105. The shims such as used at 61 in the splice press 17 are of course omitted, and plate 63 may be welded to plates 55 and 57. A locking screw 107 is threaded in a tapped hole in plate 63 for locking the lower chord press in adjusted position by engagement of the inner end of the screw with plate 63. When the splice press is made adjustable on beam 15, it may be similarly provided with rollers 103 and 105 and a locking screw 107.

The peak press 21 is fixed in position between the center rails 11 adjacent their forward end. It is similar to the splice press 17 in comprising a fixed upper platen 55, a vertical plate 57, a bed plate 59, a hydraulic cylinder 73, a ram 75, a ram plate 79, and a lower platen 87 on the ram plate. It is mounted on a base 109 (see FIGS. 14 and 15) with its throat opening rearward, i.e., in the direction toward the splice press 17. Pivots 25 for the swinging booms 23 are constituted by bolts extending vertically between the plates 55 and 59 of the peak press 21 and located between the vertical plates 57 and 63 of the peak press. Lower platen 87 of the peak press has a hole 111 (see FIG. 16) offset from its center adapted to receive a pin 113 serving as a stop for locating the peak end of one of the upper chord members 3 of the truss, pin 113 then being removable so that the other upper chord member 3 may be put into place with its end butted against the end of the previously placed upper chord member.

The heel presses 29 and upper chord presses 31 are similar to the other presses in that each comprises a fixed upper platen 55, a vertical plate 57, a bed plate 59, a hydraulic cylinder 73, a ram 75, a ram plate 79 and a lower platen 87, and are similar to the lower chord presses 19 in that each has rollers 103 and 105 for rolling on the respective boom 23. Each boom 23 is similar in the construction to travelling beam 15. Each heel press and each upper chord press also has a locking screw 107 for locking it in adjusted position on the respective boom.

Each heel press 29, each lower chord press 19 and each upper chord press 31 has a rectangular plate 115 secured to one side of its bed plate 59, a rectangular plate 117 secured to the front of its bed plate, and a bracket 119 extending out from plate 117, and is further provided with a vertically slidable plate 121 at the other side. FIGS. 6–11 show the detail of these plates and the bracket on one of the heel presses 29, and it will be understood that the detail is the same for the other heel press and the lower and upper chord presses except that parts on those presses to the left of the center of the apparatus are arranged oppositely to the parts on those presses to the right of center. This will be apparent from FIG. 2. Bracket 119 has an upwardly extending finger 120 at its outer end. The plate 121 is vertically slidable in guides 123 on the outside of a latch plate 125 secured to the other side of the bed plate 59 from the side to which plate 115 is secured. The vertically slidable plate 121 has lugs 127 at the sides engageable by arms 129 on the ram plate 79. Plate 121 carries a latch 131 comprising a plunger extending through a hole 133 in plate 121 and a keyhole slot 135 (see FIG. 10) in plate 125. Latch 131 has a head 137 at its inner end larger than the lower portion of the keyhole slot and smaller than the upper portion of the keyhole slot. It is biased outward by a spring 139 acting against a knob 141 at its outer end. The sliding plate 121 normally occupies a lowered position wherein latch 131 extends through the lower portion of the keyhole slot and head 137 engages the inside of latch plate 125. As the ram plate 79 rises, arms 129 on the ram plate engage lugs 127 on plate 121 and move the latter upward. When latch 131 comes into the upper portion of the keyhole slot, it snaps outward since head 137 is adapted to enter the upper portion of the keyhole slot, and this latches plate 121 in a raised position. Plate 121 may subsequently be returned to lowered position by pushing in the latch to retract the head 137 from the upper portion of the keyhole slot.

The peak press 21 is provided at both sides thereof with vertically slidable plates 121 identical to those above described. As shown in FIGS. 14–16, it is also provided with a bracket 143 at the front of the bed plate 59. A hydraulic cylinder 145 extends vertically downward from bracket 143. A piston rod 147 extends upward from a piston 149 in the cylinder through an opening in the bracket. A stripper rail 153 is mounted on the upper end of the piston rod. A rod 155 extends down from the stripper rail through a hole in the bracket to prevent rotation of the stripper rail. Each lower chord press 19 is also provided with a stripper rail arrangement substantially identical to that for the peak press, except that the stripper rail itself is shaped somewhat differently and accordingly designated 153a to distinguish it from stripper rail 153 for the peak press. Rail 153 carries an outwardly extending bracket 119a.

The booms 23 carry upper chord clamps 159 (see FIGS. 14 and 15) adjacent the peak press for clamping the upper chord members 3. These are commercially available manually operable toggle clamps each having a clamping jaw 161 on a pivoted clamp arm 163, an operating lever 165 and a toggle link 167. Tripper bars 169 for tripping the levers 165 to release the clamps are pivotally mounted at 171 on the vertically slidable plates 121 of the peak press. It will be understood that levers 165 are pushed down to close the clamp, and that tripper bars 169 are movable upward with supports 121 to swing levers 165 upward to trip the clamps and open them.

Each heel press 29 is additionally provided with a vertical clamping pin 173 extending upward through an angled slot 175 in the platen 87 of the press from a bar 177 slidable in a groove 179 in the bottom of the platen (see FIGS. 6, 7, 12 and 13). The outer end of the bar 177 is engageable by a manually operable toggle clamp 181 of a commercially available type which is mounted on the ram plate 79 of the press. This clamp comprises a clamping bar 183 having a screw 185 adjustably threaded in one end thereof, the screw being engageable with bar 177, and bar 183 being operable by a hand lever 187 through a toggle mechanism 189.

Each outer rail 27 comprises a pair of opposed channels 191 (see FIGS. 2, 12, 17 and 18), the ends of which are secured to posts 193. The channels are spaced so that there is a slot 195 between their upper flanges. Each boom 23 has at its outer end a bottom plate 197 and spaced vertical plates 199 and 201 extending transversely with respect to the length of the boom. A roller 203 is journalled at its ends in the vertical plates extending horizontally and parallel to the boom. This roller is located on the rearward side of the boom. Plates 199 and 201 overhang the bottom plate on this side, and roller 203 is located rearward of the rear edge of the bottom plate 197, extending down below the level of the bottom plate. Roller 203 is adapted to roll on top of the channels 191. Bottom plate 197 has a slot 205 (see FIG. 2) extending parallel to the boom on the forward side of the boom. A locking bolt 207 extends vertically through this slot 205 and through the slot 195 between the upper flanges of channels 191. A collar 209 is provided on the lower end portion of the locking bolt to be engageable with the bottoms of these upper flanges. A locking lever 211 having a cam edge 213 is pivoted at the upper end of the bolt. The cam edge is engageable with bottom plate 197 on the boom. The resultant of the weight of the heel press and the upper chord press on the boom 23 is offset toward the rearward side of the boom. Accordingly, it establishes a moment tending to twist the boom clockwise about the line of contact of roller 203 and channels 191 as viewed in FIG. 17. Lever 211, when swung up, releases the bottom plate 197 to swing up under this moment and clear the channels 191 as viewed in FIG. 18 so that the boom may be easily shifted by the rolling of roller 203 on the channels. Lever 211, when swung down, draws up the collar 209 into engagement with the bottom of the top flanges of channels 191 and springs the bottom plate 197 down against these flanges to lock the boom in adjusted position.

It will be understood that the apparatus is provided with suitable hydraulic circuits for controlling the various hydraulic cylinders. The hydraulic circuits may be controlled from a control box such as indicated at 215 in FIGS. 2 and 3 mounted on carriage 13 in a position accessible to an operator standing on platform 37.

It will be further understood that means may be provided for holding the upper chords 3 in butting engagement at the peak. For example, brackets may be provided on booms 23 which are adjustable on the booms and adapted to be locked in adjusted position by a clamp screw, these brackets carrying swivel screws having a swivel foot for engaging the outer ends of the upper chords. These brackets would be located outward of the heel presses.

Operation of the apparatus illustrated in FIGS. 2–18 is as follows:

The booms 23 are adjusted on outer rails 27 to the angle corresponding to the pitch of the upper chords 3 of the truss to be fabricated, and locked in position by swinging locking levers 211 upward. The heel presses 29 are adjusted on booms 23 to positions appropriate for the span of the truss to be fabricated. The lower chord presses 19 are adjusted on travelling beam 15 to positions wherein each is spaced from the splice press 17 one-sixth the span (assuming that the splice press is on center). If the splice press is adjustable, and moved off center as for splicing a fourteen-foot member and a sixteen-foot member, the lower chord presses will still be adjusted to the same positions as when the splice press is on center. The upper chord presses 31 are adjusted on booms 23 to positions midway between the peak press 21 and the heel presses 29. At the start of operations, the travelling beam 15 is retracted (i.e., spaced rearward from peak press 21 a distance greater than the height of the truss to be fabricated), all the clamps are open, all the vertically slidable plates 121 are down, and the strippers 153 and 153a are down.

The beam 15 is moved forward by means of cylinders 39 to a preliminary position wherein the throats of the splice press 17 and the lower chord presses are aligned with brackets 119 on the heel presses. The bottom nail plates N1—N5 are placed on the lower platens 87 of the several presses. The two lower chord members 1a are put into position on lower chord supports 93 of the splice press 17 and on brackets 119 of the heel presses 29. The ends of the lower chord members 1a in the splice press 19 are butted together, the joint being lined up with groove 89 in platen 87 of the splice press by sighting through hole 91. Clamps 95 are then closed to clamp lower chord members 1a down on supports 93 and back against plate 57 of the splice press 17 (see FIGS. 4 and 5).

The left-hand upper chord member 3 is then inserted in the throats of the left-hand heel press 29, the left-hand upper chord press 31 and the peak press 21, and pushed endwise against removable stop pin 113 extending up from lower platen 87 of the peak press properly to locate its upper end. The left-hand manual peak clamp 159 is then closed to clamp the left upper chord member 3 in position. Pin 113 is removed, and the right-hand upper chord member 3 is inserted in the throats of the right-hand heel press 29, the right-hand upper chord press 31 and the peak press 21. The right-hand upper chord member 3 is pushed endwise so that its upper end butts the upper end of the left-hand upper chord member 3. It will be understood that the upper chord members 3 will have been pre-cut with mitered ends for abutment at the peak. The right-hand manual peak clamp 159 is then closed to clamp the right upper chord member 3 in position.

The beam 15 is then moved somewhat farther forward, but not completely to its final position, and the struts 5 and ties 7 are put into position as appears in FIG. 2. Struts 5 extend from within the throats of the lower chord presses 19 to within the throats of the upper chord presses 31. Struts 7 extend from within the throats of the lower chord presses to within the throats of the peak press 21. Positioning of the struts and ties may be facilitated, if desired, by using suitable stop pins (not shown) extending upward from the lower platens 87 of the lower and upper chord presses. The beam 15 is then moved forward to its final position determining the height of the truss. This moves the lower chord 1 (consisting of members 1a) forward so that its ends are contiguous to the upper chord members 3 adjacent the heel ends of the latter, and so that it engages the lower ends of the struts and ties. Then the manual clamps 181 on the heel presses 29 are closed to drive pins 173 against the lower chord 1 and clamp the ends of the latter against the upper chord members 3.

The top nailing plates N1—N5 are then inserted, and the hydraulic cylinders 73 of all the presses are operated to drive the rams 75 and lower press platens 87 upward, thereby to drive the nailing plates into the truss timbers. Here it will be understood that the platens 87 drive the bottom nailing plates upward into the truss members and lift the latter, and that the top nailing plates are driven into the truss members by reaction from the fixed upper platens 55 of the presses.

When the ram plates 79 and lower platens 87 of the peak press 21, the heel presses 29 and the lower and upper chord presses 19 and 31 rise to drive the nailing plates, the vertically slidable plates 121 are lifted as previously described and latched by latches 131 in raised position. They then hold the completed truss up above the level of pins 173 (and whatever locating pins may be used in the lower and upper chord presses). Also, peak clamps 159 are automatically opened by tripper bars 169 which rise with plates 121 of the peak press 21.

The ram plates and lower platens of all the presses are then lowered, but the completed truss T remains up, being supported on the raised truss supporting plates 121. Clamps 95 on the splice press 17 remain closed to grip the truss. Beam 15 is now moved rearward away from the peak press 21, and the truss T, being gripped by clamps 95, is pulled rearward out of the peak press, the upper chord presses and the heel presses, being then supported on brackets 119 which extend rearward from the heel presses and the upper chord presses and bracket 119a of the peak press. Rearward movement of the truss is stopped at an appropriate point, clamps 95 are opened, and beam 15 is then moved farther rearward to clear the splice press 17 and the lower chord presses 19 from the lower chord of the truss. Then, the stripper rails 153 and 153a are raised by means of stripper cylinders 145 to raise the entire truss into a position for ready removal from the apparatus. Finally, the stripper rails and plates 121 are returned to their initial positions, and the apparatus is then ready for fabricating another truss.

Figure 22:
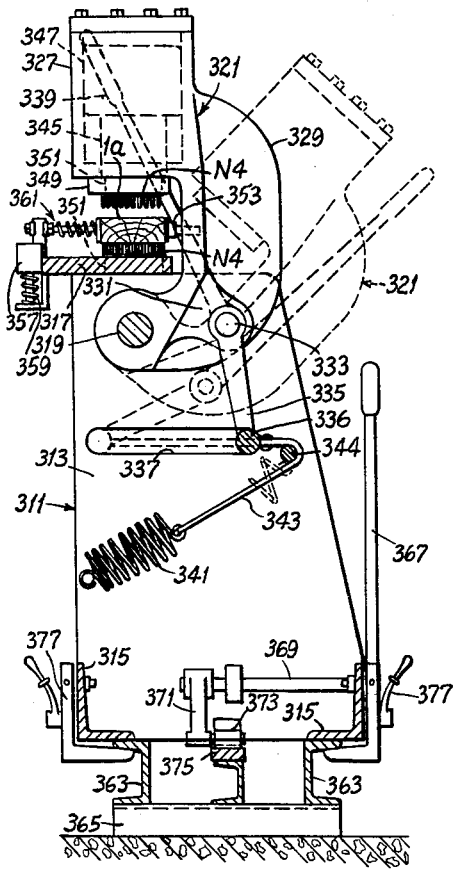
FIG. 22 is an enlarged vertical section taken on line 22—22 of FIG. 19, showing one of the presses of the FIG. 19 apparatus.
Figure 23:
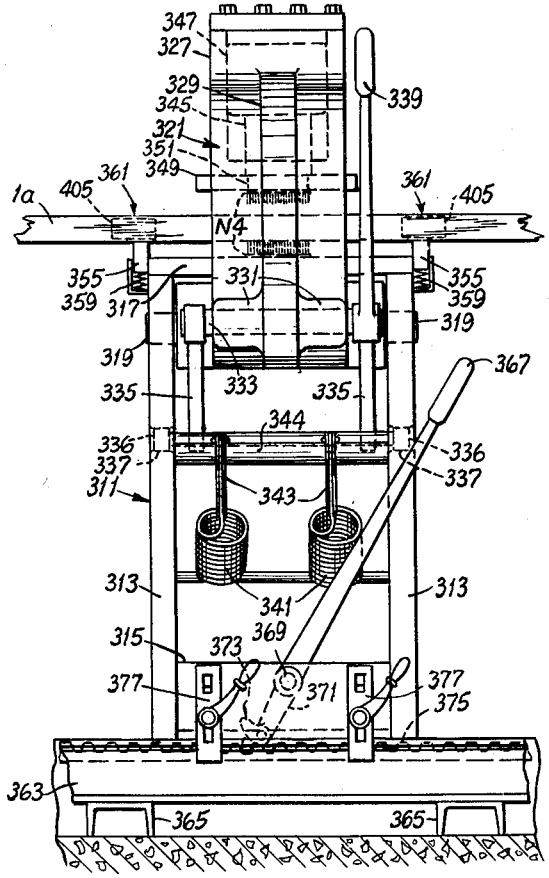
FIG. 23 is a rear elevation of the press shown in FIG. 22.
Figure 24:
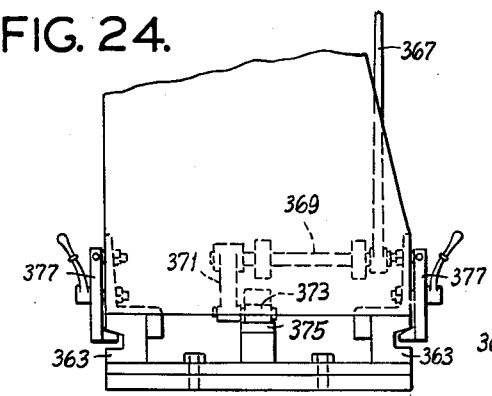
FIG. 24 is a vertical cross section taken on line 24—24 of FIG. 20.
Figure 25:
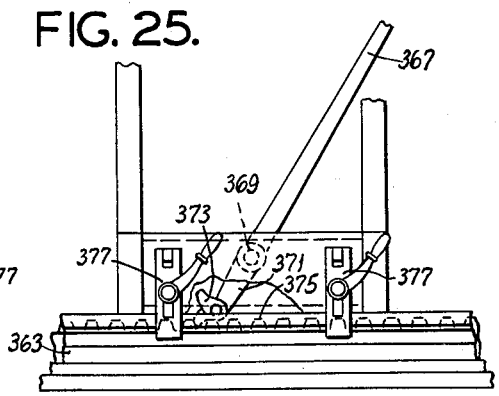
FIG. 25 is a rear elevation of FIG. 24 with parts broken away.

Referring to FIG. 19, a second embodiment of this invention for fabricating wood roof trusses is shown to comprise a hydraulic splice press 301 for driving splice plates N1, two lower chord presses each designated 303 for driving lower chord plates N4, a peak press 305 for driving peak plates N3, two heel presses each designated 307 for driving heel plates N2, and two upper chord presses each designated 309 for driving upper chord plates N5. FIGS. 22 and 23 illustrate one of the lower chord presses 303. The other presses are substantially identical thereto.

Referring to FIGS. 22 and 23, the press illustrated therein is shown to include a base generally designated 311 and comprising a pair of vertical side plates 313 held in assembly by a pair of angle irons 315 extending transversely of the base between the bottom corners of the side plates and by a platen 317 spanning the side plates at the top thereof. The angle irons and platen are secured as by welding to the side plates. Extending between the side plates 313 below the fixed platen 317 is a horizontal pin 319. A C-frame 321 constituting the press head is pivoted at its lower end on pin 319. The C-frame has a hydraulic cylinder 327 at its upper end. The axis of this cylinder is substantially perpendicular to and approximately intersects the axis of pin 319. The C-frame is swingable between the closed position illustrated in solid lines in FIG. 22 wherein cylinder 323 is located in generally vertical position above the fixed platen 317 and the open position illustrated in dotted lines in FIG. 22 angled back from the fixed platen. It is not essential that the axis of cylinder 327 exactly intersect the axis of pin 319. For example, the axis of the cylinder may be offset somewhat back into the throat of the press from the axis of pin 319, and the C-frame will then tend to rock to the closed position when the hydraulic cylinder is operated to drive nailing plates.

The C-frame or press head 321 has a reinforcing rib 329 on the back. This rib is formed with lateral bosses 331 in which is journalled a pin 333. Arms 335 are fixed on the ends of pin 333 and extend down therefrom adjacent the insides of side plates 313. Each arm 335 carries a follower 336 at its lower end which is slidable in a horizontal cam slot or track 337 provided in the respective side plate 313 below the pin 319. Slots 337 extend from a point forward of the vertical plane of pin 319 to a point rearward of this plane, extending farther rearward from this plane than forward.

The closed position of the press head 321 is determined by engagement of followers 336 with the rearward ends of the slots 337 and the open position of the press head is determined by engagement of followers 336 with the forward ends of the slots. A hand lever 339 extends upward from one of the arms 335 (being rigid with this arm) for rotating the arms. When the press head is in open position, lever 339 is angled back. By swinging it forward, arms 335 are swung counterclockwise as viewed in FIG. 22 on the axis of pin 333. Followers 336 move rearward in slots 337 to the rearward ends of the slots. This cams pin 333 upward and swings the press head to closed position. Counterbalance springs 341 are connected by means of cables 343 to the lower ends of the arms 335 to assist the closing of the press head. Cables 343 are guided over a crossbar 344. It will be observed from FIG. 22 that when the press head is in closed position, arms 335 are angled rearward off vertical. This overcentering means tends to automatically lock the press head in closed position.

A ram 345 extends down from piston 347 in the cylinder 327, and has a platen 349 at its lower end. Platen 349 has a permanent magnet 351 incorporated therein for magnetically gripping a nailing plate thereto. The lower press platen 317 may similarly have a permanent magnet 351 incorporated therein for magnetically gripping a nailing plate. A stop 353 extends forward from the back of C-frame 321 for engagement by the rear face of a truss member placed in the press. This stop is preferably adjustable to extend different distances into the throat of the press to accommodate truss members of different sizes. Stripper rails 355 and 357 are provided at the sides and front, respectively, of the lower press platen 317. These rails are biased upward by springs 359 to a raised position above the lower press platen 317. At each side of the press is a clamp 361 for clamping a truss member therein. These clamps will be described in conjunction with an ensuing description of certain additional features of the peak press 305.

In the FIG. 19 apparatus, the two lower chord presses 303 and the two heel presses 307 are slidable in the direction of length of the lower chord of the truss to different positions of adjustment for fabricating trusses of different dimensions. The splice press 301 may also be slidable in the direction of length of the lower chord to different positions of adjustment for different splice locations. For this purpose, each of these presses is slidable on a pair of channel-section rails 363. These rails are mounted on ties 365 with their flanges extending outward (see FIG. 22). The throats of all five of these presses open in the direction toward the peak of the truss, so that their heads 321 are adapted to rock back away from the lower chord of the truss being fabricated. For moving these presses, each is provided with a hand lever 367 extending upward from a jackshaft 369. The latter has an arm 371 carrying a pawl 373 engageable with a rack 375 extending between rails 363. Pawl 373 is a double pawl, pivoted on arm 371, adapted to be swung from a position for jacking the press one way on the rails to a position for jacking the press the other way on the rails. Clamps 377 are provided on the press for clamping it to the rails 363 in adjusted position.

The peak press 305, instead of being fixed as in the FIG. 2 embodiment, is slidable heightwise of the truss to different positions of adjustment for fabricating trusses of different dimensions. For this purpose, the peak press is slidable on a pair of channel-section rails 379 (see FIGS. 19 and 20). It is adapted to be jacked one way or the other on these rails by jacking means similar to that provided for presses 301, 303 and 307, except that the jackshaft 369 for the peak press extends at right angles to the peak press side plates 313 instead of parallel thereto. The peak press also has clamps 377 for clamping it to rails 379.

Figure 26:
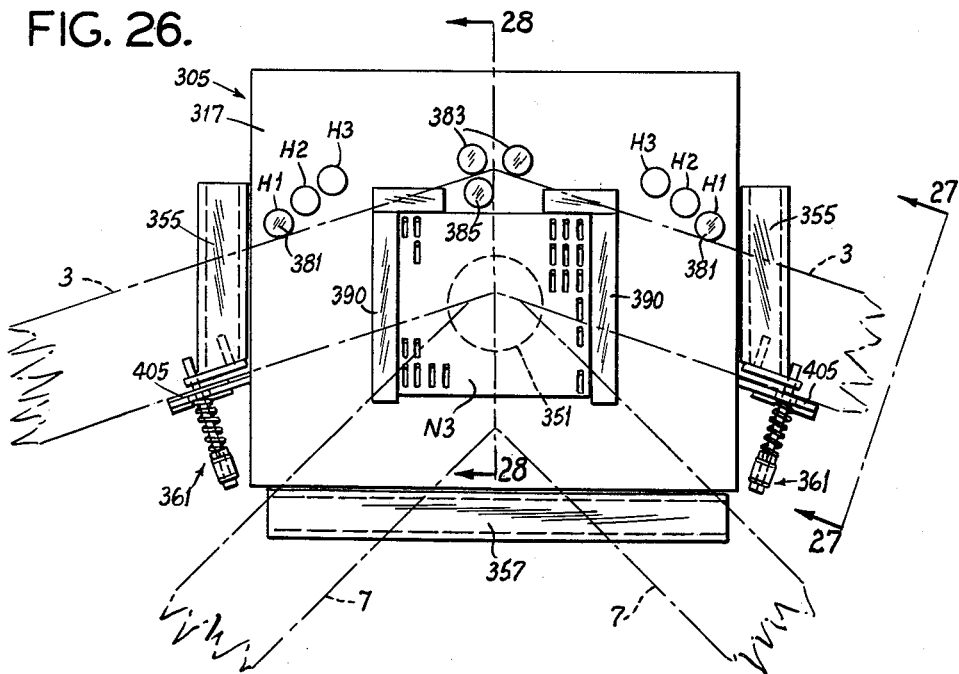
FIG. 26 is a plan view of the lower platen of the peak press of FIG. 19.
Figure 28:
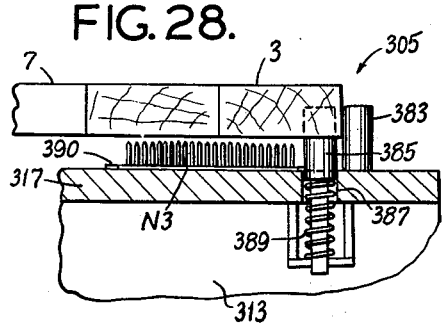
FIG. 28 is a vertical section taken on line 28—28 of FIG. 26.

The lower platen 317 of the peak press 305 is provided with two series of holes H1, H2, H3 (see FIG. 26) adapted to receive pins for positioning the upper chord members 3 of a truss. Pins 381 are shown in holes H1. These pins may be placed in others of the holes for properly positioning the upper chord members of trusses of different pitch. Peak positioning pins are indicated at 383 in FIG. 26. A retractable upper chord end positioning pin is indicated at 385 in FIGS. 26 and 28. This extends through a hole 387 in lower platen 317 of the peak press, and is biased upward to a raised position by a spring 389. The axis of pin 385 is offset to one side of the peak line of the truss, the left side as shown in FIG. 26, with the right side of the pin on the peak line. Nailing plate guide means such as indicated at 390 may be provided on the lower platen 317 and the upper platen of the press. Similar guide means may be used on the other presses.

Figure 27:
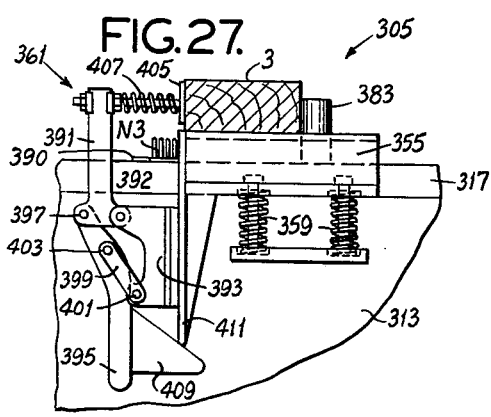
FIG. 27 is a view in elevation taken on line 27—27 of FIG. 26.

Clamps 361 on the peak press are adapted to clamp the upper chord members 3 back against the pins 381 and 383. As shown best in FIG. 27, each clamp 361 comprises an arm 391 pivoted at 392 on a bracket 393 mounted on the base of the press. An operating lever 395 has a pin connection 397 at the arm. A toggle link 399 has one end pin-connected at 401 to the bracket 393 and at 403 to the arm. Arm 391 carries a jaw 405 engageable with the forward side of a truss member in the press. Jaw 405 is yieldable against a spring 407 to accommodate for variations in dimensions of the truss members. Lever 395 has a triangular ear 409 engageable by an actuator 411 extending down from the side stripper rail 355 of the peak press. The arrangement is such that when lever 395 is swung down to the position illustrated in FIG. 27, clamp arm 391 is swung up for engagement of jaw 405 with a truss member in the press (the truss member being supported on stripper rail 355). The jaw clamps the truss member against pins 381 and 383. With lever 395 down, ear 409 is positioned below the actuator 411. Then, when the ram of the press comes down, it drives the truss member down toward the lower platen 317. The truss member depresses stripper rail 355, and the actuator 411 moves down with the stripper rail. The actuator then cams the lever 395 outward to trip the clamp, and the clamp arm 391 swings outward and downward away from the truss member.

As previously mentioned presses 301, 303, 307 and 309 all have truss member clamps 361 like those on the peak press 305. It will be understood, however, that as to presses 301, 303 and 309, the clamp jaws 405 will be at right angles to the sides of these presses to be parallel to the members received in these presses (i.e., at right angles to the side stripper rails 355 of these presses), and that as to each of the heel presses 307, the clamp jaw for the lower chord will be parallel to the lower chord and the clamp jaw for the upper chord will be parallel to the upper chord.

In placing the upper chord members 3 in the peak press 305, the peak end of the right upper chord member is butted against the retractable stop pin 385, and is clamped by the right side clamp 361 of the peak press. The right upper chord member 3 is supported on the right side stripper rail 355 of the peak press (see FIGS. 26 and 27), the stripper rail springs 359 being strong enough to bear its weight. The upper end of pin 385 when raised is below the top surface of the chord member as supported on the stripper rail 355 (see FIG. 28). The peak end of the left upper chord member is butted against the peak end of the right upper chord member and laid on top of pin 385, which sinks under the weight of the left upper chord member to permit the peak end of the left upper chord member to mate with the peak end of the right upper chord member. Then, the left upper chord member is clamped by the left side clamp 361 of the peak press.

As shown in FIGS. 19–21, 24 and 25, the upper chord presses 309 are slidable on channel-section rails 413 extending lengthwise of booms 415 pivoted at 417 on opposite sides of peak press 305 for swinging movement on vertical axes. The angle of the booms may be changed in accordance with the adjustment of the peak press on its rails 379 for different upper chord inclinations. Each upper chord press 309 has jacking means identical to that provided for presses 301, 303 and 307 for jacking it one way or the other on rails 413 and has clamps 377 for clamping it in adjusted position on rails 413. It will be observed that while presses 301, 303 and 307 are adjustable laterally and while peak press 305 is adjustable forward and rearward, presses 309 are in effect adjustable both laterally and forward and rearward, as is necessary for positioning them at the midpoints of the upper chords 3. The peak press 305 and the upper chord presses 309 are arranged with their throats opening in the direction toward the lower chord of the truss so that their heads 321 are adapted to rock back away from the upper chords of the truss being fabricated.

Figure 29:
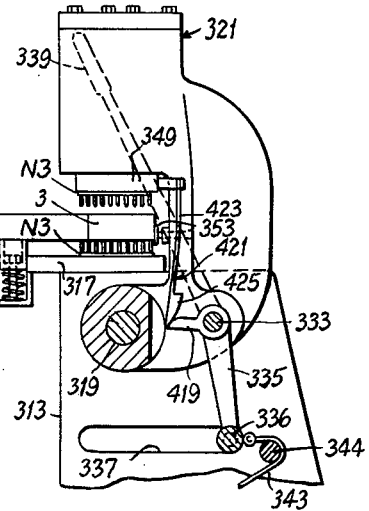
FIG. 29 is a vertical section through a press of FIG. 19 illustrating an automatic opening feature.

FIG. 29 illustrates mechanism for automatically opening a press in response to retraction of its ram 345. This mechanism comprises a dog 419 extending forward from pin 333 and a tripper 421 extending down from the upper press platen 349 consisting of a leaf spring 423 having a hook 425 at its lower end. When the ram moves down, hook 425 snaps in under the dog, and when the ram is retracted upward, hook 425 swings the dog and pin 333 and arms 335 clockwise as viewed in FIG. 29 to throw the press head 321 open.

It will be understood that suitable means may be provided for holding the upper chords 3 in butting engagement at the peak. Such means may be mounted on the heel presses, provision being made for adjustment for various overhangs of the upper chords from the heel presses.

Operation of the apparatus illustrated in FIGS. 19–29 is as follows:

With the heads 321 of all the presses open, nailing plates N1–N5 are placed on the lower platens 317 and the upper platens 349 of the presses, being guided into proper position by guide means 390 (such as shown in FIG. 26) and held in position by magnets 351. The various truss members are then placed in position, resting on stripper rails 355 and 357, and clamped by means of clamps 361. Then, all the presses are closed by means of the hand levers 339. This involves swinging each hand lever counterclockwise from the open-press position to the closed-press position illustrated in FIG. 22. It will be understood that power means, such as a hydraulic cylinder, may be used instead of the manual hand lever for closing each press. In each press, when closed, the axis of cylinder 327 and ram 345 is vertical. The axis of pin 319 (the fulcrum of the press head 321) is directly or at least approximately directly below the axis of cylinder 327 and ram 345. Then, the hydraulic cylinders 327 of all the presses are operated to drive the rams 345 downward thereby to drive the nailing plates into the truss members. If the fulcrum of a press head 321 is directly below the axis of the cylinder 327 and ram 345, the only possible forces on the closing linkage for the press head tending to throw it open are those resulting from not having the loads distributed perfectly underneath the center of the ram. These forces, however, are negligible, and only a relatively light closing linkage is required. Accidental opening of the press head is avoided by having arms 335 slightly off vertical when the press head is closed as appears in FIG. 22. Accidental opening may also be avoided by having the axis of cylinder 327 offset back from the fulcrum of the press head, so that the head tends to rock to closed position, as previously mentioned.

It is to be observed that, when each press head is closed and as it approaches its closed position, a high mechanical leverage is obtained by reason of the provision of slots 337 and arms 335, thus applying sufficient force on adjustable timber stop 353 to force timbers which might be warped into proper position.

When the rams 345 move downward, stripper rails 355 and 357 move downward, and clamps 361 are thereby automatically opened. This does not occur until the nailing plates have been partially driven into the truss members. After the nailing plates have been fully driven, the rams are retracted (i.e., moved upward). When trippers such as are shown in FIG. 29 are used, all the presses are thereupon automatically opened. Otherwise, they may be manually opened by swinging the hand levers 339 (or by means of hydraulic cylinders when such cylinders are used for swinging the C-frames of the presses instead of the hand levers). Stripper rails 355 and 357 lift the completed truss, and it may then be readily removed.

It will be observed that in the FIG. 2 apparatus workmen need to walk around booms 23 and rails 27 for safe movement from the front to the rear of the apparatus and back. However, in the FIG. 19 apparatus, access is greatly improved, and may be further improved, if desired, by mounting the tracks on which the presses slide in recesses in the floor and using sliding floor plates to cover the recesses.

Figure 30:
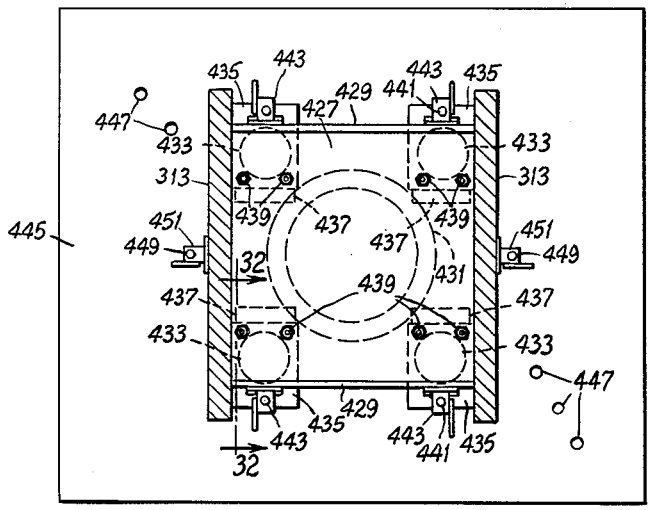
FIG. 30 is a horizontal section illustrating a modification.
Figure 31:
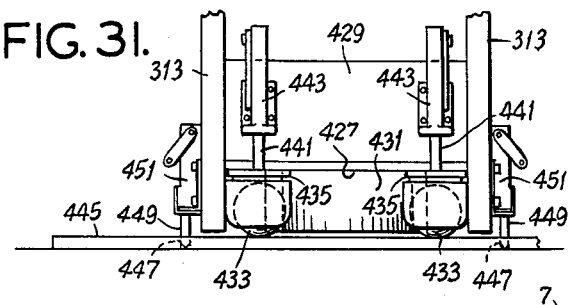
FIG. 31 is a view in elevation of FIG. 30.
Figure 32:
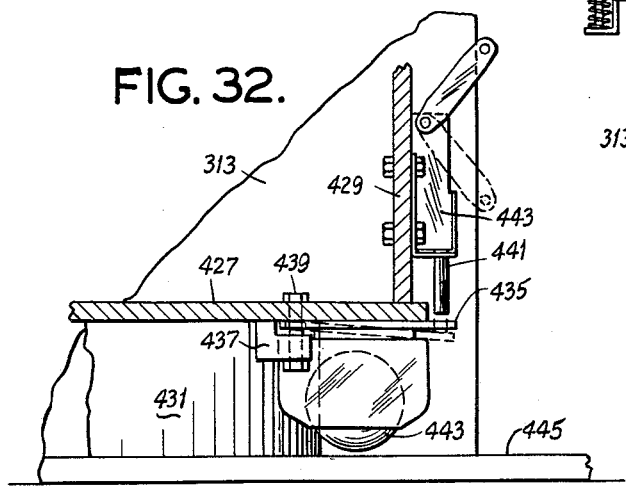
FIG. 32 is an enlarged view taken on line 32—32 of FIG. 30.

FIGS. 30–32 illustrate an alternative mode of providing for adjustment of a press, particularly adapted for the upper chord presses 309 to eliminate the use of booms 415. As shown, the press is provided with a horizontal plate 427 adjacent the bottom and vertical plates 429 extending between side plates 313 above plate 427. An electromagnet 431 is mounted on the bottom of plate 427 with its bottom surface flush with the bottom edges of side plates 313. Ball casters 433 are provided at the four corners of plate 427. Each caster has a flat head 435, the inner end of which extends into an angle member 437 on the bottom of plate 427 and has holes receiving bolts 439. The inner end of head 435 has play on bolts 439 between plate 427 and the horizontal flange of angle member 437. The outer end of head 435 projects from under plate 437 and is engageable by plunger 441 of a push-pull clamp 443 mounted on vertical plate 429.

When the plungers 441 are retracted upward from caster heads 435, the bottom of the electromagnet 431 and side plates 313 bear on a magnetic (steel) floor plate 445 (see FIG. 32). Then, by energizing the electromagnet, the press is magnetically gripped in adjusted position on the floor plate. To move the press, clamps 443 are manually operated to drive plungers 441 downward. Casters 433 then bear on the floor plate and the press is lifted relative to the casters for disengagement of the electromagnet and side plates 313 from the floor plate (see FIG. 31) so that the press may be easily rolled on the floor plate. Suitable positioning holes 447 may be provided in the floor plate, adapted to receive plungers 449 of push-pull clamps 451 mounted on side plates 313.

Figure 33:
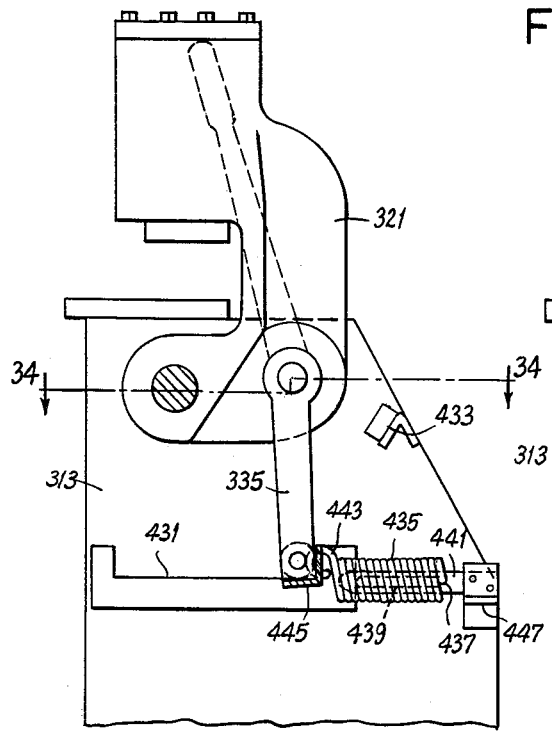
FIG. 33 is a view similar to FIG. 22 illustrating a modification.
Figure 35:
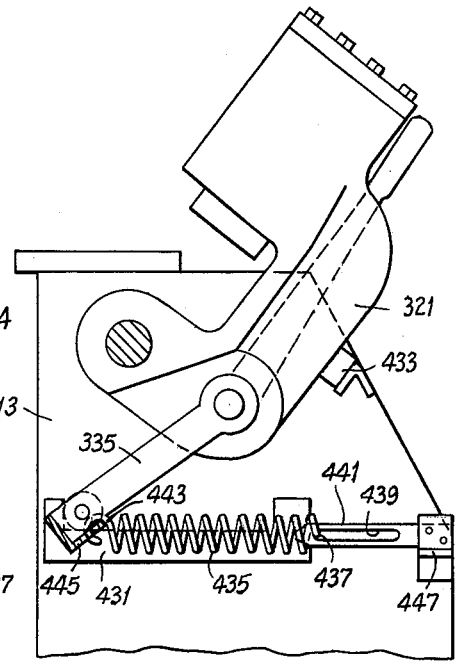
FIG. 35 is a view corresponding to FIG. 33 showing a moved position of parts.
Figure 34:
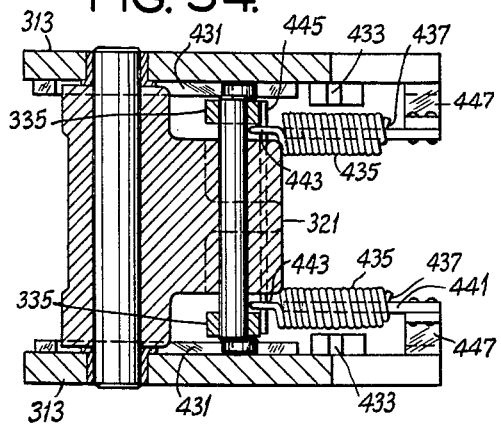
FIG. 34 is a horizontal section taken on line 34—34 of FIG. 33.

FIGS. 33–35 illustrate a modification of the swinging head press above described in which, instead of having rollers 336 on arms 335 riding in slots 337 in side plates 313, these rollers ride on tracks 431 mounted on the inside of side plates 313. FIGS. 33–35 also show backstops 433 on the side plates 313 engageable by the C-frame or press head 321 to limit its backward swing and determine its open position. FIGS. 33–35 also show a different counterbalance spring arrangement, involving the provision of a pair of coil tension springs 435 having their rearward ends 437 slidable in horizontal slots 439 in bars 441 and their forward ends 443 hooked into a crossbar 445 extending between the lower ends of arms 335. Bars 441 are mounted on the inside of side plates 313 by means of brackets 447. Springs 435 are contracted and their rearward ends 437 are toward the rearward ends of slots 439 when the press head 321 is in closed position (FIG. 33). As the press head swings open, the springs are dragged forward without being tensioned until their rearward ends engage the forward ends of the slots. Then, on continued swinging of the press head in opening direction, the springs are stretched (see FIG. 35). Thus, the springs do not impede the initial phase of the opening of the press head, remaining untensioned until the press head is partly open, after which the weight of the head is effective to cause the head to swing open. It will be seen that this apparatus will also overcenter and automatically lock the press head in a closed position in response to movement of the press head to closed position.

The FIG. 19 embodiment may also be used for fabricating hip trusses as well as triangular trusses by swinging the booms 415 to extend parallel to the lower chord of the truss to be fabricated and adjusting the upper chord presses 309 on the booms to the appropriate positions for driving nailing plates at the hips of the truss. Heel presses 307 are used to drive nailing plates at the heels of the hip truss, lower chord presses 303 are used to drive nailing plates for joining the lower ends of web members of the hip truss to the lower chord. Splice press 301 may be used for splicing two lower chord members. Peak press 305 would not ordinarily be used except for clamping purposes unless used to splice two upper chord members. For driving nailing plates at other joints of the hip truss, a portable press or presses would be used.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for fabricating triangular wood trusses of the type having a lower chord, upper chords, struts extending from the lower chord to the upper chords and ties extending from the lower chord to the peak of the truss, comprising a hydraulic peak press for driving nailing plates into upper chord and tie members at the peak of the truss, said peak press being fixed in position, a hydraulic splice press for driving nailing plates into two lower chord members and a pair of hydraulic lower chord presses for driving nailing plates into the lower chord and strut and tie members, a travelling beam carrying the splice press and lower chord presses for conjoint movement forward toward the peak press and rearward away from the peak press, a pair of booms each pivoted at one end at the peak press, rails supporting the outer ends of the booms, hydraulic upper chord presses on the booms for driving nailing plates into the upper chord and strut members, hydraulic heel presses on the booms for driving nailing plates into the lower chord and upper chord members at the heels of the truss, said upper chord and heel presses projecting rearward from the booms and their weight thereby causing a twisting moment on the booms, each boom having supporting means at its outer end carrying a clamp located forward of the boom for clamping the boom to the respective rail and a roller located rearward of the boom engaging the respective rail, said clamp being adapted to clamp the boom to the rail against said moment, the boom twisting clear of the rail about said roller due to said moment when the clamp is released.

2. Apparatus for fabricating triangular wood trusses of the type having a lower chord, upper chords, struts extending from the lower chord to the upper chords and ties extending from the lower chord to the peak of the truss, comprising a hydraulic peak press for driving nailing plates into upper chord and tie members at the peak of the truss, said peak press being fixed in position, a hydraulic splice press for driving nailing plates into the two lower chord members and a pair of hydraulic lower chord presses for driving nailing plates into the lower chord and strut and tie members, a travelling beam carrying the splice press and lower chord presses for conjoint movement forward toward the peak press and rearward away from the peak press, a pair of booms each pivoted at one end at the peak press, rails supporting the outer ends of the booms, hydraulic upper chord presses on the booms for driving nailing plates into the upper chord and strut members, hydraulic heel presses on the booms for driving nailing plates into the lower chord and upper chord members at the heels of the truss, each of said presses comprising a fixed upper platen and a hydraulically actuated vertically movable lower platen, the splice press and the lower chord presses each having a forwardly opening throat, the peak press and the upper chord and heel presses each having a rearwardly opening throat, the heel presses and the upper chord presses having rearwardly extending truss supporting brackets, the lower chord presses having forwardly extending truss supporting brackets, and clamps associated with the splice press adapted to clamp a completed truss for pulling the truss out of the peak press and the upper chord and heel presses onto the respective brackets on the upper chord and heel presses when the travelling beam is moved rearward, said beam being movable farther rearward after release of said clamps to withdraw the splice press and lower chord presses from the truss and the lower chord then being supported on the brackets on the lower chord presses.

3. Apparatus as set forth in claim 2 wherein the peak press, the upper chord presses, the heel presses and the lower chord presses have vertically movable truss supporting plates, means for moving said truss supporting plates upward in response to rise of the lower platens of said presses, and means for latching said truss supporting plates in raised position to hold up the truss.

4. A press comprising a base, a platen fixed on the base, a head pivotally mounted on the base for swinging movement between an open and closed position about a horizontal axis located below the fixed platen, a fluid-operated cylinder carried by the head with its axis substantially at right angles to and approximately intersecting said horizontal axis, said cylinder being located in generally vertical position above the fixed platen when said head is in closed position, and adapted to swing back from above the fixed platen when the head is moved to said open position, a ram extending from the lower end of the cylinder, and overcentering means connected between said head and said base for swinging the head from open to closed position, said overcentering means being movable from a first to a second position for swinging the head from closed to open position and movable back to its first position for swinging the head from open to closed position and overcentering as it swings, said overcentering means when moved to its first position acting automatically to lock the head in closed position.

5. A press as set forth in claim 4 wherein said overcentering means comprises an arm pin-connected at one end to the head and having a follower at the other end slidable in a cam track on the base, and means for swinging the arm.

6. A press as set forth in claim 5 further comprising means for swinging the arm to swing the head from closed to open position in response to retraction of the ram.

7. A press as set forth in claim 4 wherein said overcentering means comprises an arm having a pin connection at one end to the head, extending down from the head, and having a follower at its lower end engaging a generally horizontal cam track on the base below the pivotal axis of the head, the head occupying its closed position when the follower is at the rearward end of the track, the head occupying its open position when the follower is at the forward end of the track, the pin connection being raised and the arm being inclined rearward when the follower is at the rearward end of the track, the pin connection being lowered and the arm being inclined forward when the follower is at the forward end of the track, and means for swinging the arm.

8. A press as set forth in claim 7 wherein the means for swinging the arm comprises a hand lever rigid with the arm.

9. A press as set forth in claim 8 further comprising means for swinging the arm to move the follower forward from the rearward end of the track in response to retraction of the ram thereby to swing the head from closed to open position.

10. A press comprising a base, said base comprising a pair of side plates, a platen fixed on top of said side plates, a pin extending between said side plates underneath said fixed platen, a C-frame pivoted at its lower end on said pin, a fluid-operated cylinder at the upper end of the C-frame, the axis of the cylinder being substantially at right angles to and approximately intersecting the axis of said pin, said C-frame being swingable between a closed position wherein said cylinder is located in generally vertical position above the fixed platen and an open position angled back from said fixed platen, a ram extending from the lower end of the cylinder, and overcentering means for swinging the C-frame from open to closed position, said overcentering means being movable from a first to a second position for swinging the C-frame from closed to open position and movable back to its first position for swinging the C-frame from open to closed position and overcentering as it swings, said overcentering means when moved to its first position acting automatically to lock the C-frame in closed position.

11. A press comprising a base, said base comprising a pair of side plates, a platen fixed on top of said side plates, a pin extending between said side plates underneath said fixed platen, a C-frame pivoted at its lower end on said pin, a fluid-operated cylinder at the upper end of the C-frame, the axis of the cylinder being substantially at right angles to and approximately intersecting the axis of said pin, said C-frame being swingable between a closed position wherein said cylinder is located in generally vertical position above the fixed platen and an open position angled back from said fixed platen, a ram extending from the lower end of the cylinder, said side plates having generally horizontal cam tracks below said pin, a pair of arms pin-connected at one end to the C-frame and having followers at their other end engaging said tracks, and means for swinging said arms, the C-frame occupying its closed position when the followers are at the rearward ends of the tracks and occupying its open position when the followers are at the forward ends of the tracks.

12. A press as set forth in claim 11 wherein the arms are inclined rearward when the followers are at the rearward ends of the tracks.

13. A press as set forth in claim 11 further comprising means movable with the ram and engageable on retraction of the ram when the C-frame is in closed position with means movable with said arms for swinging said arms forward thereby to swing the C-frame to open position.

14. A press comprising a base, a platen fixed on the base, a head pivotally mounted on the base for swinging movement between an open and closed position about a horizontal axis located below the fixed platen, a fluid-operated cylinder carried by the head with its axis substantially at right angles to and approximately intersecting said horizontal axis, said cylinder being located in generally vertical position above the fixed platen when said head is in a closed position and adapted to swing back from above the fixed platen when the head is moved to said open position, a ram extending from the lower end of the cylinder, means for swinging the head from said open to said closed position, and means for swinging the head from closed to open position in response to retraction of the ram.

15. Apparatus for fabricating wood trusses of the type having a lower chord, upper chords, struts extending from the lower chord to the upper chords and ties extending from the lower chord to the peak of the truss, comprising a first hydraulic press for driving nailing plates into upper chord and tie members at the peak, second and third hydraulic presses for driving nailing plates into the lower chord and upper chord members at the heels of the truss, fourth and fifth hydraulic presses for driving nailing plates into the lower chord and strut and tie members, sixth and seventh hydraulic presses for driving nailing plates into the upper chord and strut members, stripping means for raising a completed truss from the presses, said stripping means comprising stripper members located adjacent at least some of the presses, means mounting said stripper members for up and down movement, and means for moving said stripper members upward for raising a completed truss.

16. Apparatus as set forth in claim 15 wherein at least one of the presses has clamps associated therewith for clamping truss members therein prior to driving the nailing plates, and means responsive to operation of the press with which the clamps are associated for automatically releasing said clamps.

17. Apparatus as set forth in claim 15 wherein each of said presses comprises a lower platen and a press head carrying an upper platen, hydraulically actuated means for moving one of said platens, said press head being movable between a closed position wherein said upper platen is above the lower platen to an open position wherein said upper platen is substantially clear of the lower platen.

18. A press for driving nailing plates into timbers comprising a base member and a C-frame head member, a first platen connected to the head member, a second platen connected to the base member, fluid-actuated means for moving one of said platens toward the other platen, said head member being movable between a closed position wherein the first platen is above the second platen and an open position wherein the first platen is substantially clear of the second platen, said C-frame head member and base member defining a throat open at the front and both sides of the press for reception of timbers into which nailing plates are to be driven, and means for automatically locking the head member in its closed position in response to movement of the head member to its closed position.

19. A press as set forth in claim 18, wherein said means for automatically locking the head member in its closed position comprises overcentering means connected between said head member and said base member and adapted to swing the head member from open to closed position, said overcentering means being movable from a first to a second position for swinging the head member from closed to open position and movable back to its first position for swinging the head member from open to closed position and overcentering when it swings, said overcentering means when moved to its first position acting automatically to lock the head in closed position.

20. Apparatus for fabricating wood trusses of the type having a lower chord, upper chords, struts extending from the lower chord to the upper chords and ties extending from the lower chord to the peak of the truss, comprising a first hydraulic press for driving nailing plates into upper chord and tie members at the peak, second and third hydraulic presses for driving nailing plates into the lower chord and upper chord members at the heels of the truss, fourth and fifth hydraulic presses for driving nailing plates into the lower chord and strut and tie members, and sixth and seventh hydraulic presses for driving nailing plates into the upper chord and strut members, means supporting said presses for adjustment independently of one another with said sixth and seventh presses adjustable longitudinally in respect to the direction of length of the upper chords, and with said second, third, fourth and fifth presses adjustable longitudinally in respect to the length of the lower chord, the jaws of the first, sixth and seventh presses opening in the direction toward the lower chord, and the jaws of the second, third, fourth and fifth presses opening in the direction toward the upper chords.

21. Apparatus as set forth in claim 20 wherein at least two of said presses are movable on magnetizable floor plates and have electromagnets incorporated therein for magnetically gripping them in adjusted position on said floor plates.

References Cited in the file of this patent

UNITED STATES PATENTS

| | | |
|---|---|---|
| 1,555,233 | Stulcken | Sept. 29, 1925 |
| 2,390,849 | Shoup | Dec. 11, 1945 |
| 2,487,019 | Eichelberger | Nov. 1, 1949 |
| 2,540,106 | Eichelberger | Feb. 6, 1951 |
| 2,544,499 | Hovey | Mar. 6, 1951 |
| 2,629,318 | Schultz | Feb. 24, 1953 |
| 2,749,873 | Huffman | June 12, 1956 |
| 2,803,012 | Eddleblute | Aug. 20, 1957 |
| 2,876,450 | Eddelblute | Mar. 10, 1959 |
| 2,919,733 | Johnson | Jan. 5, 1960 |
| 2,996,721 | Black | Aug. 22, 1961 |

UNITED STATES PATENT OFFICE
CERTIFICATE OF CORRECTION

Patent No. 3,068,483                                  December 18, 1962

Walter G. Moehlenpah et al.

It is hereby certified that error appears in the above numbered patent requiring correction and that the said Letters Patent should read as corrected below.

In the grant, lines 2 to 4, for "assignors to Hydro-Air Engineering, Inc., of St. Louis, Missouri, a corporation of Missouri," read -- assignors, by mesne assignments, to Ar-Ka Engineering, Inc., of St. Louis, Missouri, a corporation of Delaware, --; line 13, for "hydro-Air Engineering, Inc., its successors" read -- Ar-Ka Engineering, Inc., its successors --; in the heading to the printed specification, lines 5 and 6, for "assignors to Hydro-Air Engineering, Inc., St. Louis, Mo., a corporation of Missouri" read -- assignors, by mesne assignments, to Ar-Ka Engineering, Inc., St. Louis, Mo., a corporation of Delaware --.

Signed and sealed this 23rd day of April 1963.

(SEAL)
Attest:

ERNEST W. SWIDER                                DAVID L. LADD

Attesting Officer                                  Commissioner of Patents